(12) United States Patent
Lorton et al.

(10) Patent No.: US 9,164,498 B2
(45) Date of Patent: *Oct. 20, 2015

(54) METHOD AND SYSTEM FOR MANAGING AND OPERATING A PLURALITY OF FARM HOUSES

(75) Inventors: Brad W. Lorton, Dacula, GA (US); Douglas J. Niemeyer, Granger, IN (US)

(73) Assignee: CTB, Inc., Milford, IN (US)

( * ) Notice: Subject to any disclaimer, the term of this patent is extended or adjusted under 35 U.S.C. 154(b) by 102 days.

This patent is subject to a terminal disclaimer.

(21) Appl. No.: 12/815,027

(22) Filed: Jun. 14, 2010

(65) Prior Publication Data

US 2010/0250198 A1 Sep. 30, 2010

Related U.S. Application Data

(63) Continuation of application No. 11/958,018, filed on Dec. 17, 2007, now Pat. No. 7,751,942, which is a continuation of application No. 10/914,682, filed on Aug. 9, 2002, now Pat. No. 7,317,969, which is a (Continued)

(51) Int. Cl.
- *A01K 11/00* (2006.01)
- *A01K 29/00* (2006.01)
- *A01K 31/18* (2006.01)

(Continued)

(52) U.S. Cl.
CPC ............... *G05B 15/02* (2013.01); *A01K 11/00* (2013.01); *A01K 29/00* (2013.01); *A01K 31/18* (2013.01); *A01K 31/22* (2013.01);

(Continued)

(58) Field of Classification Search
CPC .............. F24F 11/0001; F24F 11/0009; F24F 11/0012; G05B 15/02; G05B 2219/2642; G06F 19/3462; A01K 11/00; A01K 29/00; A01K 31/18; G06Q 10/06315
USPC .................. 700/231, 241, 275; 701/213–215; 705/1, 7.11; 340/10.41; 119/51.02; 702/188; 236/49.3

See application file for complete search history.

(56) References Cited

U.S. PATENT DOCUMENTS 5,322,034 A * 6/1994 Willham et al. ........... 340/10.41
5,457,627 A    10/1995 Cureton et al.

(Continued)

FOREIGN PATENT DOCUMENTS

WO    WO-02098213    12/2002

OTHER PUBLICATIONS

Platinum controller-Rotem.*

(Continued)

*Primary Examiner* — Robert Fennema
*Assistant Examiner* — Jennifer L Norton
(74) *Attorney, Agent, or Firm* — Harness, Dickey

(57) ABSTRACT

A system for monitoring, managing, and/or operating a plurality of farm houses on a plurality of farms is disclosed. The system includes a controller and/or a monitor box in the farm house and a computer in communication with the controller for controlling and adjusting various parameters of the farm house or with the monitor box for monitoring the farm house. The system also includes a computer at an integrator's office that is operable to monitor and/or control various parameters from the farm house remotely. These parameters enable the integrator to coordinate operations with processing plants, feed mills, field service and hatcheries. It also enables the integrator to prepare various data reports for use by the integrator or others.

27 Claims, 8 Drawing Sheets

Related U.S. Application Data continuation-in-part of application No. 10/674,282, filed on Sep. 29, 2003, now Pat. No. 7,317,968.

(60) Provisional application No. 60/414,855, filed on Sep. 30, 2002.

(51) Int. Cl.
*A01K 31/22* (2006.01)
*F24F 11/00* (2006.01)
*G05B 15/02* (2006.01)
*G06Q 10/06* (2012.01)

(52) U.S. Cl.
CPC .... *F24F 11/0009* (2013.01); *G05B 2219/2642* (2013.01); *G06Q 10/06315* (2013.01)

(56) References Cited

U.S. PATENT DOCUMENTS

| | | | |
|---|---|---|---|
| 5,482,210 A * | 1/1996 | Carey et al. | 236/49.3 |
| 5,636,118 A | 6/1997 | Brewster et al. | |
| 6,032,084 A | 2/2000 | Anderson et al. | |
| 6,342,839 B1 * | 1/2002 | Curkendall et al. | 340/573.3 |
| 6,469,628 B1 * | 10/2002 | Richards et al. | 340/573.3 |
| 6,569,092 B1 * | 5/2003 | Guichon et al. | 600/300 |
| 6,664,897 B2 * | 12/2003 | Pape et al. | 340/573.3 |
| 6,868,804 B1 | 3/2005 | Huisma et al. | |
| 6,901,369 B2 * | 5/2005 | Cureton et al. | 705/1 |
| 7,004,401 B2 | 2/2006 | Kallestad | |
| 7,140,322 B2 * | 11/2006 | Hawn et al. | 119/174 |
| 7,164,361 B2 * | 1/2007 | Poliska | 340/573.3 |
| 7,302,313 B2 * | 11/2007 | Sharp et al. | 700/276 |
| 7,317,968 B2 | 1/2008 | Lorton et al. | |
| 7,317,969 B2 | 1/2008 | Lorton et al. | |
| 7,751,942 B2 | 7/2010 | Lorton et al. | |
| 8,433,593 B2 * | 4/2013 | Stroman et al. | 705/7.11 |
| 2003/0033057 A1 | 2/2003 | Kallestad | |
| 2004/0031335 A1 | 2/2004 | Fromme et al. | |
| 2004/0123810 A1 | 7/2004 | Lorton et al. | |
| 2004/0186927 A1 * | 9/2004 | Eryurek et al. | 710/12 |
| 2005/0010333 A1 | 1/2005 | Lorton et al. | |
| 2005/0080567 A1 | 4/2005 | Wieting et al. | |
| 2005/0161007 A1 | 7/2005 | Huisma et al. | |
| 2006/0111035 A1 | 5/2006 | Kallestad | |

OTHER PUBLICATIONS

Farmhouse Controller-Rotem.*
Poultry Farm Equipment-Rotem.*
Farmm supply Communicator-Rotem.*
Rotem Communicator.*
"All New Evolution 4000 Control System" brochure. Hired-Hand New Product Release—120109.
"Communicator Advanced Versatile Communication System" brochure. Rotem.
"Communicator. User & Installation Manual." Rotem Computerized Controllers.
"Evolution 3000/3001 Control Systems," brochure. (2008) HHnet™.
"Expert Ventilation System HS," brochure. (Dec. 2007) 2 sheets. Cumberland®.
"I Box 360. The ultimate management tool." brochure. (Nov. 2008) 1 sheet. Cumberland®.
"Integra I-Box 360° Management System" brochure. (Jan. 2007) 4 sheets. Cumberland®.
"Platinum Plus. Computerized Controllers. Poultry House Control Computer," brochure. Rotem.
"Pro Vision Environmental Controller" brochure. (Nov. 2008) 4 sheets. Cumberland®.
"Remote Farm Monitoring" brochure. HHnet™.
Advisory Action mailed Aug. 6, 2007: U.S. Appl. No. 10/674,282.
Advisory Action mailed Aug. 6, 2007: U.S. Appl. No. 10/914,682.
Chris Belyavin (Technical) Ltd., "Flockdata Software", http://www.flockdata.com/site/flockdata.html, printed Aug. 1, 2002, 2 pages.
Chris Belyavin (Technical) Ltd., "Future Developments", http://www.flockdata.com/site/futute.html, printed Aug. 5, 2002, 2 pages.
Critical Wireless.Tm., Connecting Your Machines to You: One-Stop M2M, 2004.
CTB, Inc., C-Collect.Tm., Feed Scale Installation & Operator's Instruction Manual, May 2004.
CTB, Inc., C-Collect.TM., Monitor Box Installation & Operator's Instruction Manual, Oct. 2003.
Cumberland.RTM., Ventilation Climate Controller Accessories, printed Jan. 2003.
Dicam Software, "All you ever wanted to know about Dicam", http://www.dicamusa.com/Software.aspx, printed Aug. 23, 2002, 2 pages.
Dicom Software, "Dicam Services", http://www.dicamusa.com/Services.aspx, printed Aug. 23, 2002, 1 page.
Final Office Action mailed Apr. 18, 2007: U.S. Appl. No. 10/914,682.
Final Office Action mailed May 2, 2007: U.S. Appl. No. 10/674,282.
Non Final Office mailed Nov. 2, 2006: U.S. Appl. No. 10/914,682.
Non-Final Office Action mailed Nov. 2, 2006: U.S. Appl. No. 10/674,282.
Notice of Allowability mailed Aug. 23, 2007: U.S. Appl. No. 10/674,282.
Notice of Allowability mailed Aug. 23, 2007: U.S. Appl. No. 10/914,682.
Notice of Allowance and Fees Due mailed Aug. 23, 2007: U.S. Appl. No. 10/674,282.
Notice of Allowance and Fees Due mailed Aug. 23, 2007: U.S. Appl. No. 10/914,682.
Remote data capture Brochure, undated, Big Dutchman International GmbH, 1 page.
ROTEM, "Communication", http://www.rotem.com/comm.html, printed Aug. 19, 2002, 2 pages.
ROTEM, "Hogs", http://www.rotem.com/hogs1.html, printed Aug. 19, 2002, 2 pages.
ROTEM, "New Products", http://www.rotem.com/new.sub.--products.html, printed Aug. 19, 2002, 3 pages.
ROTEM, "Poultry", http://www.rotem.com/poutry.html, printed Aug. 19, 2002, 3 pages.
ROTEM, "Profile", http://www.rotem.com, printed Aug. 19, 2002, 2 pages.
Supplemental Notice of Allowability mailed Nov. 13, 2007: U.S. Appl. No. 10/914,682.
Supplemental Notice of Allowability mailed Oct. 10, 2007: U.S. Appl. No. 10/674,282.
Supplemental Notice of Allowability mailed Oct. 9, 2007: U.S. Appl. No. 10/914,682.

* cited by examiner

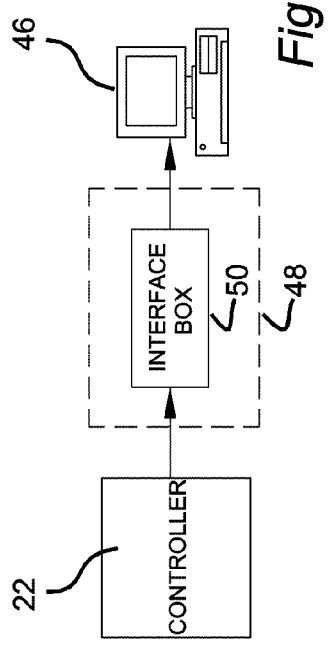
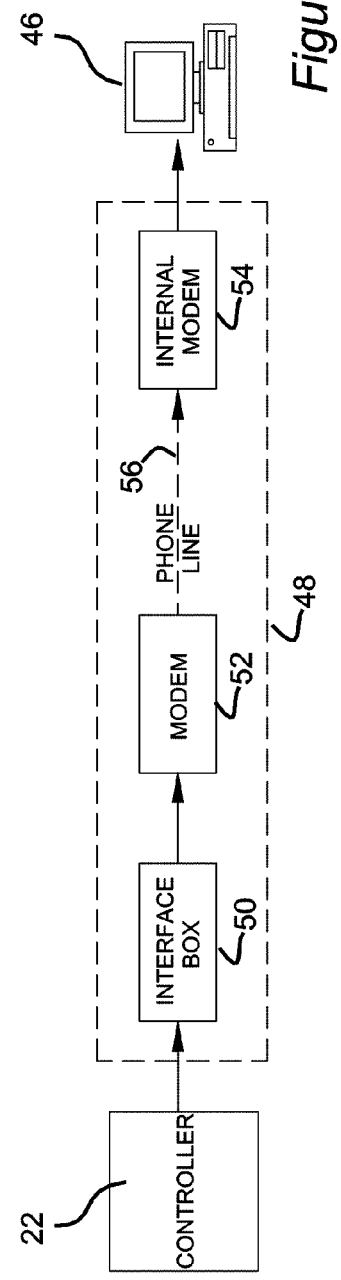
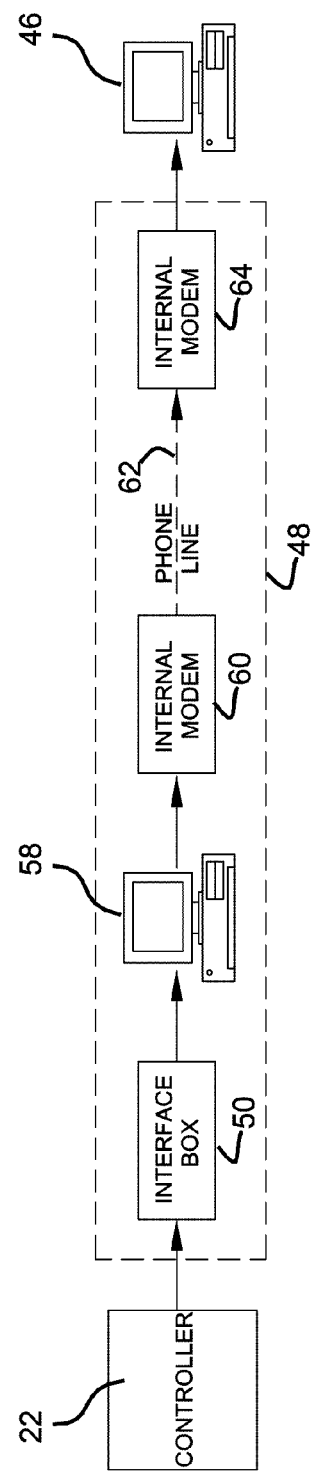

METHOD AND SYSTEM FOR MANAGING AND OPERATING A PLURALITY OF FARM HOUSES

CROSS-REFERENCE TO RELATED APPLICATIONS

This application is a continuation of U.S. patent application Ser. No. 11/958,018 filed on Dec. 17, 2007, which is a continuation of U.S. patent application Ser. No. 10/914,682 filed on Aug. 9, 2002, now U.S. Pat. No. 7,317,969 issued on Jan. 8, 2008, which is a continuation-in-part of U.S. patent application Ser. No. 10/674,282 filed on Sep. 29, 2003, now U.S. Pat. No. 7,317,968, issued on Jan. 8, 2008, which claims the benefit of U.S. Provisional Application No. 60/414,855, filed on Sep. 30, 2002. The disclosures of the above applications are incorporated herein by reference.

FIELD

The present invention relates to managing and operating a plurality of farm houses; more particularly, the invention relates to an integrator for remotely managing and operating a plurality of farm houses on a plurality of farms.

BACKGROUND

Farmers have typically managed and operated farm houses, such as chicken houses and hog houses, by performing the day to day farm tasks manually. These tasks primarily included providing adequate feed and water to the housed animals or livestock. Over time, farmers have determined that controlling certain parameters could lead to higher yields and quality in the livestock. For example, temperature, humidity, ventilation, feed cycles and lighting all contribute to successful livestock and improved yields. Moreover, through the selective breading process, certain desired characteristics like meat yield have been modified. However, some selective breading may result in an animal that may be stressed very easily based upon changes in the surrounding environment. These types of animals require very specific conditions in order to thrive. Maintaining these specific conditions requires a significant amount of oversight and time to ensure the proper environment is maintained.

Control systems for farm houses initially started with simple analog controls, such as thermostats to control temperature in the farm house. Digital controllers soon followed and have generally replaced manual or analog controls in farm houses. By way of example and not limitation, CTB, Inc., of Milford, Ind. offers a Chore-Tronics(®) controller that is capable of allowing the farmer to monitor and control several parameters. These parameters are generally controlled automatically, via various sensors and actuators positioned throughout the farm house. The parameters controlled in a farm house, such as a poultry or hog house generally include, temperature, humidity, water, ventilation, timers for feeder and waterers, and timers for lights.

The farmer may typically adjust the farm house controller either on-site or through a processor, such as a personal computer (PC), that is in communication with the farm house controller. The PC may be located at the farmer's office on the farm or at a site remote from the farm. Integrators that provide the animals, feed and support, as well as harvest the mature animals, however, generally do not have access to any information from the farm houses. This can result in the integrators receiving different quality product from different farms, which is undesirable. For example, providing consistent weight for chicken breast meat or other desired meats is of critical importance to the integrator and its customers. Because of this, the integrator needs to properly schedule harvesting of the livestock to ensure the desired weight of the animal is reached when the animal is harvested. Also, feed delivery and ensuring that there is enough feed at each farm is also of critical importance to the integrator. If there is insufficient feed available, the animals may be stressed. If too much feed is delivered to the farm, a specialized truck may be required to pick up the excess feed at the farm adding additional cost to the integrator.

There is, therefore, a need by the integrators to monitor and possibly control the various farm houses it contracts with to ensure high quality, consistent and low cost yields.

SUMMARY

A system may be provided to monitor various conditions within a compound, such as a farm house. The system may include a central portion that is able to receive signals from one or more sensors that may sense a condition within the compound such as temperature, humidity, wind speed, or other appropriate conditions. The system may process the signals to produce a data set that may be transmitted to a user. The user may be able to analyze the data and/or control the compound based, at least in part, upon the data transmitted form the system.

According to various embodiments a system to receive signals regarding a state of a sensor may includes a sensor operable to sense a state and produce a signal relative to the state. A monitoring system may be provided to receive the signal regarding the state of the sensor. A transmission system may transmit the received signal to a user.

According to various embodiments an apparatus for monitoring a sensor is disclosed. The apparatus may include an user input mechanism operable to allow a first user to input an instruction. A data input mechanism may receive a signal from a source and a processor may process at least one of the instruction or the signal. Also a transmission portion may transmit a data to a second user.

According to various embodiments a farm house monitoring system may include a sensor operable to sense a condition of a farm house and produce a signal based upon a state of the condition. An input portion may receive the signal from the sensor and a processor may process the signal from the sensor. An output portion may output the signal processed by the processor and a transmitter may transmit the processed signal to a user.

According to various embodiments a method of monitoring data regarding conditions relative to a farm house is disclosed. The method of monitoring may include sensing a condition regarding the farm house with a sensor and monitoring the sensed condition of the farm house. The sensed condition may be transmitted and a determination of operation of the farm house may be based upon the transmission.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 3A-3C illustrate various embodiments of a communications interface between a farm house controller and a computer;

DETAILED DESCRIPTION OF VARIOUS EMBODIMENTS

The following description of various embodiments concerning a method and system for managing and operating a plurality of farm houses on a plurality of farms are merely exemplary in nature and are not intended to limit the invention, its application, or uses. It will be appreciated by those skilled in the art that the present invention is clearly not limited to a specific type of farm, but may be applied to any type of farm application, including for example, hogs, cattle, turkeys, and fish. Therefore, although reference may be made to a chicken house and poultry farm, simply for clarity, the present description and appended claims will be understood to not be so limited.

Figure 1:
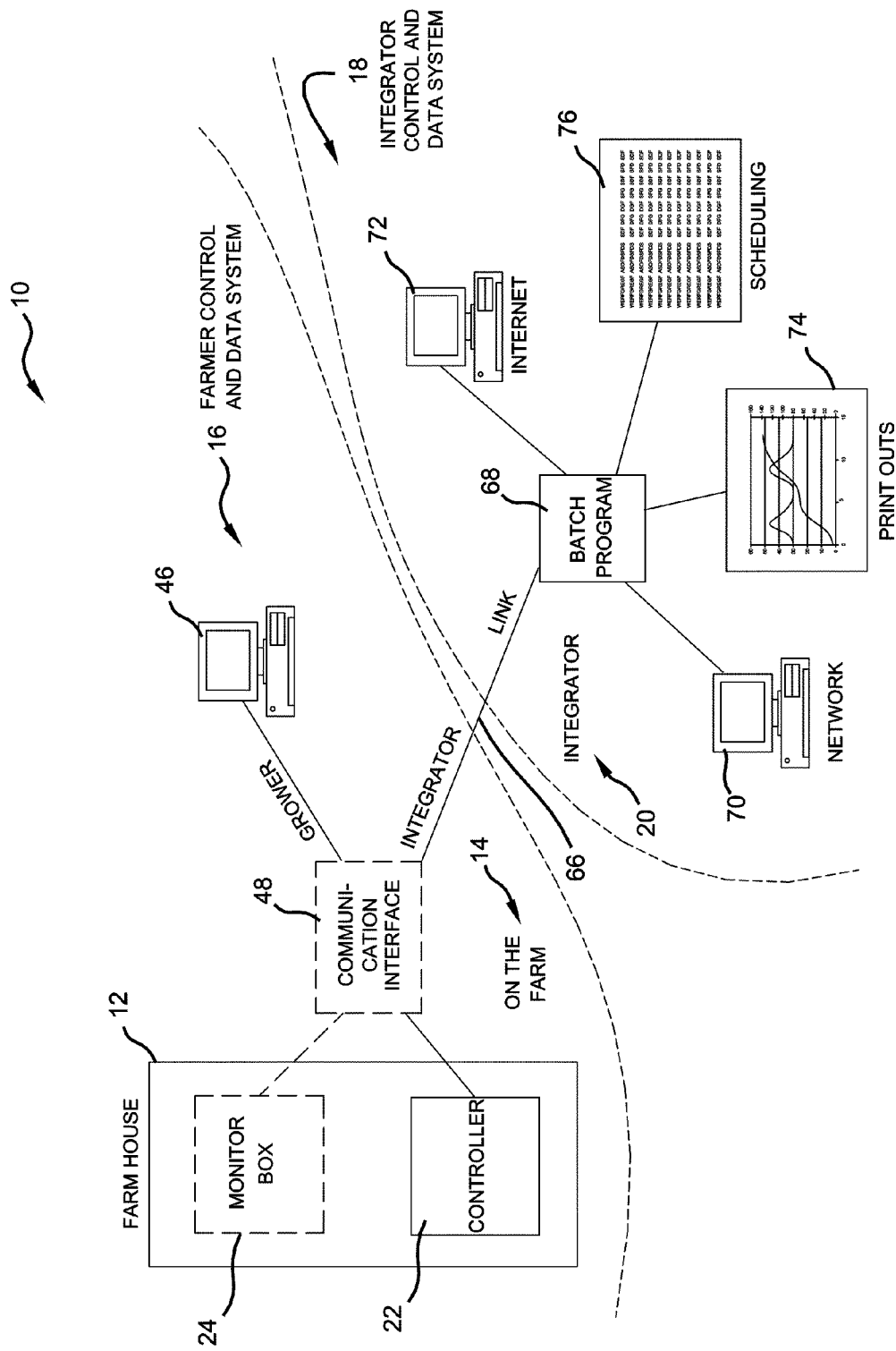
FIG. 1 is a schematic block diagram of a system for managing and operating a plurality of farm houses on a plurality of farms according to one of the various embodiments of the present invention.

Referring to FIG. 1, a system 10 for managing and operating a plurality of farm houses 12 located on one or more farms 14 is shown. The farm house 12 may be any type of farm house 12 housing any type of farm animal, such as chickens, turkeys, cattle, hogs, etc. For exemplary purposes only, the present invention will discuss managing and operating a poultry or chicken house 12. While FIG. 1 illustrates a single farm house 12 and a single farm 14, it will be understood that a plurality of farm houses 12 may be maintained on a single farm 14 or on multiple farms 14.

The system 10 for managing and operating the farm house 12 may include both a farm control and data system 16 that is typically located on the farm 14 and an integrator control and data system 18 that is typically operated by an integrator 20, which may be from a particular location or mobile, further discussed herein. Each farm house 12 within the system 10 may include at least one farm house controller 22 that is used to control various parameters within the farm house 12. By way of example and not limitation, the farm house controller may be the Chore-Tronics® controller that is offered by CTB, Inc. of Milford, Ind. Should another type of farm house controller be utilized, a monitor box 24 may be used in parallel with the controller 22 to monitor the controller 22 and provide the necessary information for data retrieval and control of the integrator 20. Thus, as described herein, the integrator 20 may receive data from the controller 22 or the monitor box 24, and may also control the farm house with the controller 22, if the system 10 is so designed.

In addition, with further detail to the controller 22 and/or the monitor box 24, either or both may include a memory storage system. The memory storage system may be any appropriate memory storage system, such as random access memory, flash memory, a hard drive, or other generally known memory storage device. Therefore, the information monitored or controlled may be stored by the memory device and may be downloaded to the integrator 20 or the integrator control and data system 18 or the farmer control and data system 16.

The download of data may occur at any appropriate time or any appropriate rate. For example, the systems may be automated to download data at a selected rate, such as every hour, once a day, once a month, or substantially continuously (i.e., real-time). Alternatively, the data may be downloaded at a selected time due to a selected instruction. Therefore, the integrator control and data system 18 may send an instruction to the monitor box 24 and/or the controller 22 to receive a data dump from the memory system.

In addition, as discussed above and further herein, the controller 22 may be able to sense or monitor data from each of the plurality of systems discussed herein as may the monitor box 24. If only one of the controller 22 and the monitor box 24 are provided in the farm house 12, only one may monitor the condition of the farm house 12. Nevertheless, if the controller 22 is provided, the controller 22 may both monitor and control the systems in the farm house 12. If the monitor box 24 is provided, the monitor box 24 may receive the information from the controller 22, may receive inputs from the sensors, or the systems positioned in the farm house 12. It will be understood that the monitor box 24 may only receive data from a selected source, such as a sensor and not form the controller 22. Moreover, both the controller 22 and the monitor box 24 may be provided together or alone in the farmhouse. 12. Therefore, the integrator control data system 18 may communicate with either or both of the controller 22 and the monitor box 24 to receive the selected data.

With further reference to FIG. 1, it will be understood that the farm house 12 may house any appropriate or selected livestock, such as chickens and hogs. In addition, the farm house generally includes at least one controller 22 and/or one monitor box 24. For clarity of the following discussion, the controls included in the controller 22 are able to control various parameters of the farm house 12, as discussed further herein. The controller 22 may be owned by the integrator 20 as a part of the integrator control and data system 18 or may be owned by the farmer and rented and used by the integrator 20 in the integrator control and data system 18. Similarly, the monitor box 24 may be owned and operated by the integrator 20 for the integrator control and data system 18 and simply be positioned in the farm house 12. Alternatively, the farm house 12 may only include the monitor box 24 which is then monitored and data sent to the integrator control and data system 18. Therefore, although the controller 22 and/or the monitor box 24 may be present within the farm house 12, it will be understood that the controller 22 and the monitor box 24 are not necessarily owned by the farmer or the grower and may be owned by the integrator 20.

Figure 2:
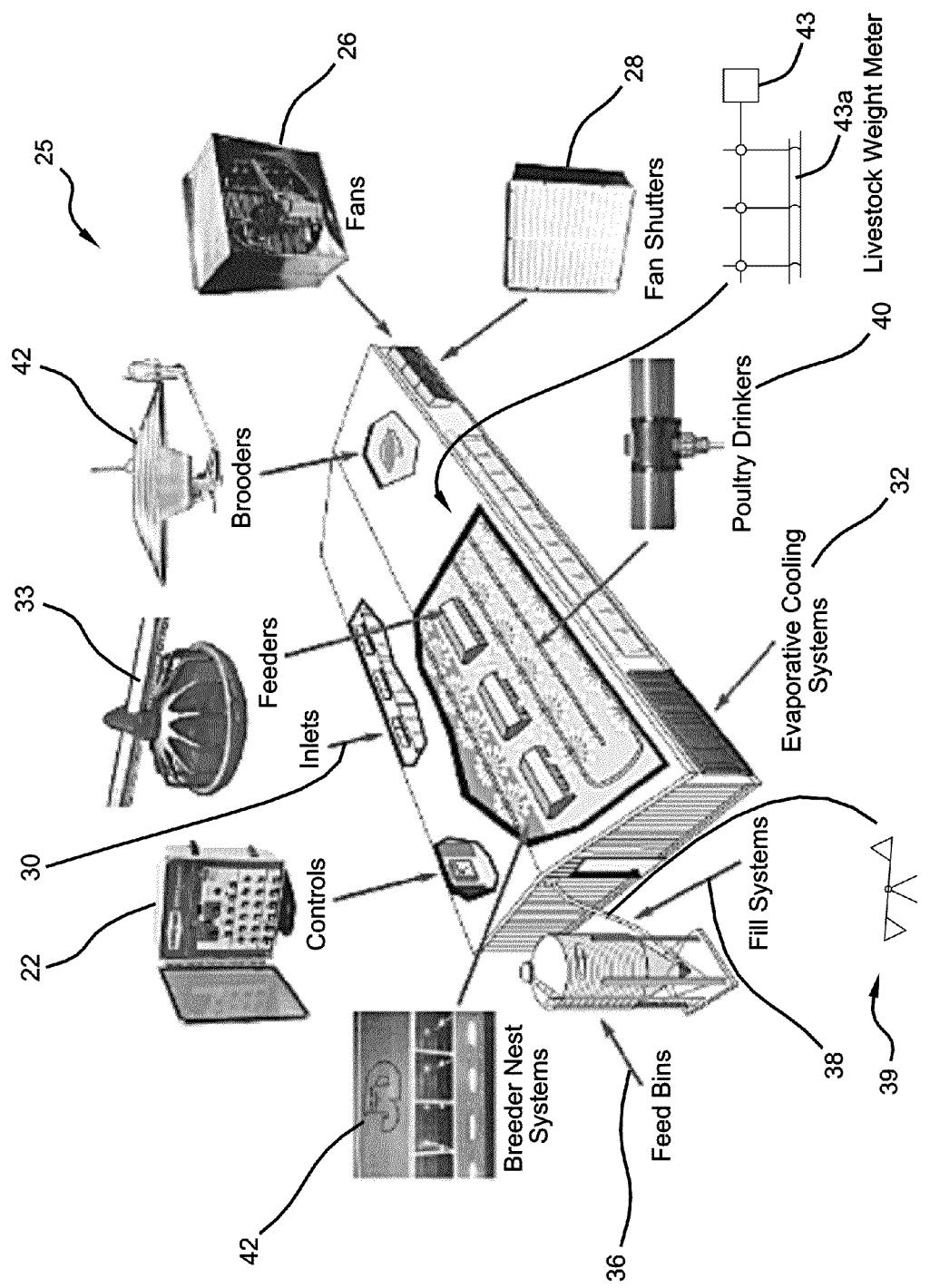
FIG. 2 is a perspective view of a poultry or chicken house illustrating the various systems that may be controlled and monitored within the poultry house.

An exemplary farm house is a poultry house 25, as shown in FIG. 2, the farm house controller 22 is able to monitor and control many parameters. The various systems that can be monitored and controlled by the farm house controller 22 include a ventilation system that is used to control the ventilation, in the poultry house 12. The ventilation system typically includes fans 26 that can be turned off and on, fan shutters 28 that may be used to open and close that allow for the pressure differentiation to allow the fans 26 to move air and inlet doors 30 to control the amount of fresh air intake into the farm house 12. The ventilation system, including the various components, may affect control parameters such as temperature, air quality, such as ammonia and $CO_2$ concentration, within the farm house 12, oxygen levels, and others.

Although temperature may be indirectly controlled, via the ventilation system, it may also be directly controlled by an evaporative cooling system 32 and brooders 33. The evaporative cooling system 32 can not only adjust the temperature parameter but also a humidity level parameter within the farm house 12 by drawing air through a wetted pad. Should heating be required within the poultry house 12, the controllable brooders 33 may be utilized in combination with the evaporation cooling system 32. Therefore, control parameters temperature, humidity, and the like may also be controlled in the farm house by the evaporative cooling system 32 and brooders 33.

The control parameters for feeding and watering of the chickens may be controlled by way of automated feeders 34 that are supplied by a feed bin 36 and a fill system 38. For example, the fill system 38 may include a flow meter 39 that is able to substantially precisely, within selected tolerances, measure the amounts of feed provided to the farm house 12 that is consumed by the livestock contained therein. For example, a flop scale or flow meter, generally known in the art, may be used as part of the fill system 38 to precisely determine the amount of feed provided to the feeders 34. Water is delivered by an automated poultry drinker system 40.

Automated breeder nest systems 42 may also be monitored and controlled by the farm house controller 22. The breeder nests 42 may assist in controlling the number of livestock produced in the farm house 12.

The monitor box 24 and/or the control box 22 may also be used to monitor the weight of the livestock, such as with a weight meter 43. The weight meter 43 may be any appropriate meter, such as one that measures the force produced on a roosting rod 43a of a chicken roost. Therefore, the weight of the livestock may be monitored and other control parameters may be altered depending upon the monitored weight parameter. Also the weight parameter may be a result parameter, as discussed herein.

It should further be noted that other controls may also be performed by the farm house controller 22 and the above systems are merely exemplary systems and parameters that may be controlled. For example, monitoring livestock weight, air quality, such as $CO_2$ and nitrogen concentration, in and around the farm house 12, waste from the farm house 12, animal conditions, etc. As a further example, an animal scale or animal weight monitor may also be controlled by the controller 22 or monitored by the monitor box 24. Therefore, a weight combination of all the livestock or of each of the individuals within the livestock population may be monitored through the controller 22 or the monitor box 24.

As discussed herein, the monitor box 24 may also be included within the farm house 12, either alone or in addition to the controller 22. The monitor box 24 may be connected to the controller 22 or any appropriate information source, so that information monitored within the farm house 12 may be used to determine selected control parameters by the controller 22. Alternatively, the controller 22 may include software, hardware, or combinations thereof to both monitor and control the various parameters of the farm house 12 and the monitor box 24 provides an interconnection between the controller 22 and a non-related system, such as the integrator data and control system 18. The controller 22 may also incorporate the features of the monitor box 24 directly into the controller 22, thereby eliminating the need for a separate monitor box 24. Therefore, the controller 22 and/or the monitor box 24 may owned or operated by the integrator 20 such that the integrator 20 may both monitor and control, as selected by the integrator 20, the farm house 12.

Returning to FIG. 1, the farmer control and data system 16 controls and monitors primarily the feeding and watering, as well as the internal environment of the farm house 12. This control system 16 is generally performed on the farm 14 by way of a computer 46 that is in communication with the controller 22 or monitor box 24 in the farm house 12. The computer 46 communicates with the controller 22 or monitor 24, via a communications interface 48. The computer 26 may be integrated into the controller 22 or the monitor box 24 or may be positioned remotely from the farm house 12. The communications interface 48 can consist of any type of interface capable of transferring control and data signals between the farm house 12 and the computer 46.

For example, as shown in FIGS. 3A-3C, various hardware communication connections are illustrated. As shown in FIG. 3A, the communications interface 48 includes an interface box 50 that is hard wired between the controller 22 and the computer 46 by twisted pair wire, Universal Serial Bus (USB) connections, RS 232 connections, or any other type of connection. The interface box 50 may include only a single connection to the computer 46, that may be positioned on the farm 14, or even within the farm house 12, and may also include a connection to the integrator 20 as discussed herein. As shown in FIG. 3B, communications interface 48 includes the interface box 50, as well as external modem 52 and an internal modem 54 within the computer 46. This type of communication interface 48 enables remote access by the farmer and control of the controller 22, via a communications channel that may be wireless, internet connection, and/or over a phone line 56. This enables the farmer or grower to remotely access and adjust the controller 22 either on the farm 14 or at a site remote therefrom. A third type of communication interface 48, is shown in FIG. 3C, consists of a connection to various networked computers. In this regard, the communication interface 48 includes the interface box 50 that is hard wired directly to a network computer 58 that forms part of a network. The computer 58 communicates to the computer 46 by way of an internal modem 60, over a selected connection such as a wireless channel, internet connection, and/or a phone line 62 and internal modem 64, associated with the computer 46. While these different embodiments of a communication interface 48 have been illustrated, it will be understood that these embodiments are merely exemplary and any other type of two-way unsecured or secured communication channels may be employed. For example, wireless, satellite, optical, or any appropriate communications may also be used for the communications interface 48.

The computer 46 may operate with various software platforms to control and receive data from the controller 22 or the monitor box 24. An exemplary software package is C-Central software provided by CTB, Inc. of Milford, Ind., which may be used in combination with the Chore-Tronics Controller®, that may be used as the controller 22, also provided by CTB, Inc. The control and data information passed through the communications interface is generally unsecured and unencrypted. This unsecure two-way communication enables the grower or farmer to easily access the controller 22, both on the farm 14 or at a site remote from the farm 14 through the appropriate communication interface 48. Nevertheless, a secure and/or encrypted connection may be used. The farmer or grower may typically monitor and control feeding and watering of the livestock. The farmer may also monitor and control the environment in the farm house 12, which includes temperature, humidity, ventilation and lighting control of the farm house 12, utilizing the various systems shown in FIG. 2. The farmer control and data system 16 also enables the farmer to store data over time, such as temperature, as well as provide warnings if one of the controlled parameters is out of its operating range or tolerance, such as high or low temperatures. This enables the complete environmental control of the farm houses 12 by the grower or farmer, via the farmer control and data system 16.

The integrator control and data system 18 owned and/or operated by the integrator 20 at a selected location communicates with the controller 22 and/or monitor box 24, if selected, in the farm house 12, via a two-way secure or unsecured communications link 66. Here again, this communications link or channel 66 may be of any type, including a hard wire, satellite, optical, and/or wireless communication connection or channel. The integrator control and data system 18 may include any type of software capable of communicating with the controller 22 and/or the monitor box 24 for monitoring parameters within the farm house 12, as well as capable of scheduling feed deliveries, harvest schedules, servicemen reports, etc. An exemplary integrator control and data system 18 is the C-Collect system developed by CTB, Inc. of Milford, Ind., according to the teachings of the present invention.

The integrator control and data system 18 in the system 10 may be primarily used for monitoring and controlling result parameters in the farm house 12, while the farmer control and data system 16 may be primarily directed to monitoring and controlling control parameters in the farm house 12. As discussed above control parameters generally relate to those parameters of the farm house 12, such as feed rate, environment, and the like. Result parameters generally relate to the parameters of the livestock produced in the farm house 12. Therefore, result parameters may include livestock weight, livestock size, livestock health, rate of achievement of standard result parameters, and the like.

In this regard, the integrator 20, in contrast to the grower or farmer is typically responsible for everything in the farm process, except for the daily tasks regarding the farm house controls. As indicated above, and further discussed herein, the integrator 20, including the integrator control and data system 18, may communicate with the monitor in a box 24 and/or the controller 22 over the communication link 66 to the communication interface 48. Therefore, the integrator 20 may monitor the conditions of the farm house 12 through either the controller 22 or the monitor box 24. As discussed herein, the integrator 20 may use the data collected from the monitor box 24 or the controller 22 for any appropriate purpose. In addition, the integrator 20 may also control the farm house 12 with the controller 22 through the communication interface 48. Therefore, the integrator 20, as discussed further herein, may only monitor the farm house 12, in a generally real time manner, or may also control and monitor the farm house 12, also in a substantially real time manner. Therefore, the integrator 20 may not only monitor result parameters, but may also monitor control parameters and perform actions or send instructions based upon the monitored control parameter. The instructions, by way of example, may be to the farmer, one of the control systems, a service man, or a customer.

In a specific example, and not intended to be limiting, a poultry integrator may generally be responsible for providing the chicks to the farmer, maintaining feed bin inventories, coordinating feed delivery, providing technical assistance when necessary, and coordinating the harvest of mature chickens to be delivered to customers, such as processing plants and retailers. The data sent by the controller 22 and/or monitor box 24 to the integrator control and data system 18 may be either initially encrypted or non-encrypted at the controller 22 and/or the monitor box 24 before being transferred through the communications interface 48 on the two-way communications link 66. This data is then received at a batch program 68, which decrypts the data, if encrypted, for use by the integrator 20. This information may then be made available on the integrator's network 70 or provided on the internet 72 to selected users. This data can also be used to generate data printouts 74, as well as be used for scheduling 76 with other operations, such as the processing plant, feed mills, hatcheries, etc., further discussed herein.

As mentioned above, the integrator control and data system 18 may be primarily concerned with result parameters or result monitoring of raw data provided to it over the communications link 66. It should also be understood, however, that the integrator control and data system 18 may also control the farm house parameters and environment, via the controller 22 similar to the way the farmer or grower on the farm 14 may control the farm house, via computer 46. The parameters may be monitored for any appropriate reason and the following are merely exemplary and not limiting or inclusive.

The integrator 20, as discussed above, has the integrator link 66 through the communication interface 48 with either/or the monitor box 24 and the controller 22. The communication link 66 may be any appropriate communication link. The communication link 66 may be a land line link, such as a phone line, cable network or cable modem line, internet connection, or may also be a wireless connection such as a cellular connection, a satellite connection, or any other appropriate connection. Nevertheless, the integrator 20 is able to communicate through the communication interface 48 with the farm house 12. The integrator 20 may also be able to communicate with the grower computer 46 through the data link 66. Therefore, the integrator 20, as discussed above, may control the controller 22 either directly through the communication interface 48 or through the grower computer 46, depending upon the selected set-up. Nevertheless, the integrator 20 is not simply limited to receiving information from the controller 22 or the monitor box 24, depending upon whether both are present, but may also control the controller 22 through the communication interface 48.

As discussed above, one result parameter includes the weight of the livestock, such as the bird weight. This weight is used to determine and coordinate the proper harvest schedule. Feed consumption or flow rate results are monitored in order to determine feed delivery schedules to the farm 14. Mortality rates of the livestock are monitored to ensure that the proper environment is being maintained in the farm house 12. Air quality readings, such as carbon dioxide and monoxide and ammonia readings, may also be monitored by the integrator 20 to ensure that any local, state or federal regulations are met regarding air quality and health of the animals in the farm house 12. Animal welfare conditions may also be monitored by the integrator 20 by way of monitoring different environmental parameters, feed and water delivery parameters or any other relevant parameters, to confirm that the livestock are within and that the growers are complying with appropriate animal welfare conditions. The temperature, humidity, ventilation and lighting are also monitored by the integrator 20 and compared to selected standards or optimal parameters to confirm that these parameters are being met within each farm house 12 on each farm 14 monitored by the integrator 20.

In this regard, a typical integrator 20 may have contracts with several farms 14 where each farm includes several farm houses 12. This may include up to about 150-200 farms 14 and over 500 farm houses 12. The integrator control and data system 18 within the system 10 enables the integrator 20 to monitor each of the farms 14 it contracts with and/or owns, as well as each of the farm houses 12, located on each of the farms 14. This enables the integrator 20 to further compare operations, such as control parameters, of farm houses 12 to determine which of the farm houses 12 operate more efficiently or yield the best and highest quality product, generally determined with the result parameters. The control parameters of these particular farm houses 12 can then be compared with farm houses 12 that are not operating as efficiently or providing as high a yield, again generally determined with the result parameters. This enables the integrator 20 to improve the other farm houses 12, thereby resulting in a more uniform quality and yield within each farm 14. This information may also be shared across farm houses 12 and across entire farms 14. It is up to the integrator 20, however, to determine who and what data may be shared or viewed by others.

Nevertheless, according to various schemes, as discussed herein, the integrator 20 may standardize or determine optimal control parameters or various farms to achieve the best results as measured by the result parameters. As a simple example the integrator may compare a feed rate of a first farm house and a second farm house and then compare the rate which the livestock reach a selected livestock weight. If one farm house achieves the selected result parameter faster the integrator 20 is able to determine a better control parameter to achieve the selected result parameter. It will be understood, however, that many control parameters and many farm houses may be monitored and compared to determine the best control parameter. Also, many other result parameters may be considered when determine the optimal control parameters.

Figure 4:
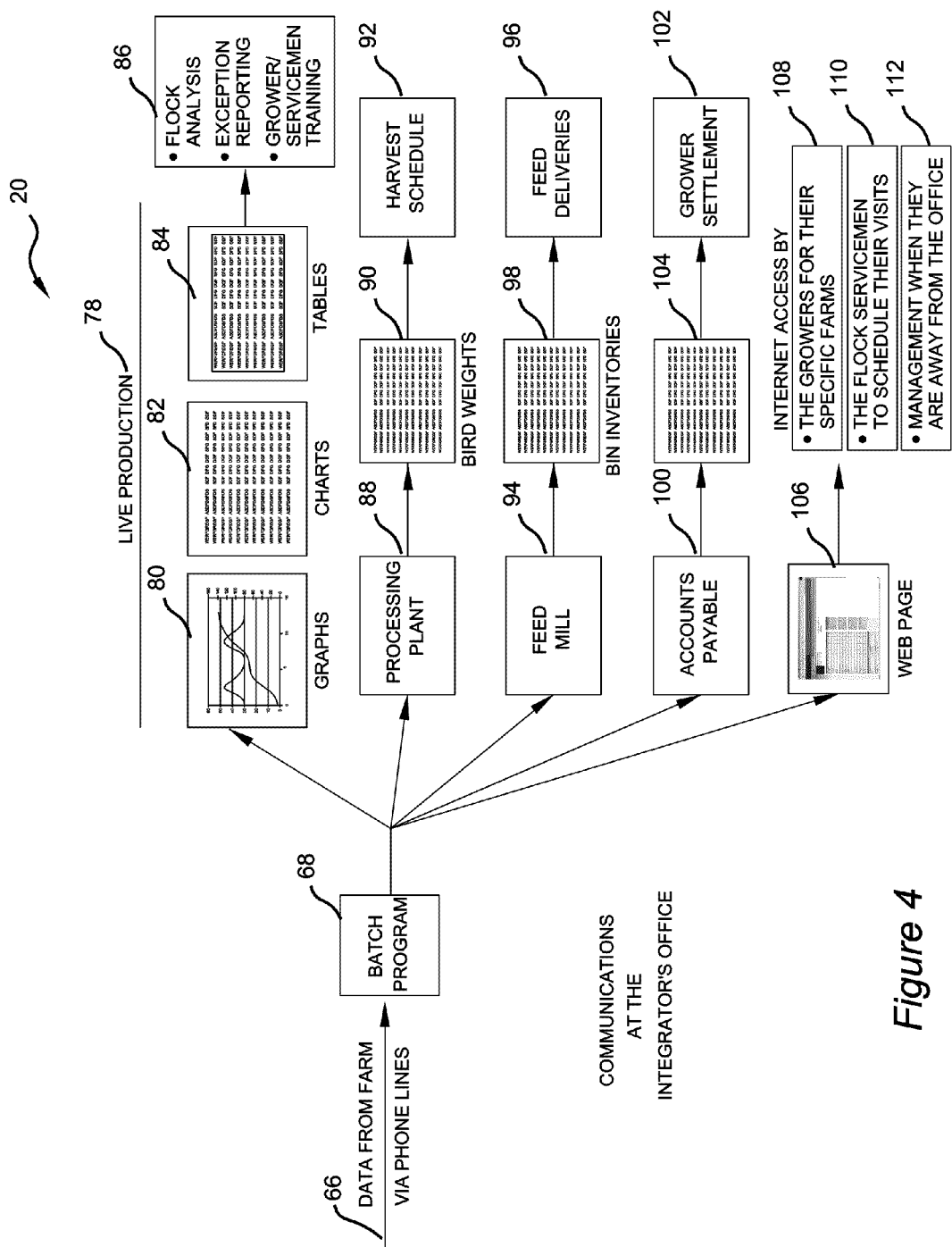
FIG. 4 is a schematic block diagram illustrating the communications at an integrators office, based upon data delivered from at least one farm.

Referring to FIG. 4, exemplary details regarding what the integrator 20 can do with the raw data collected from each farm 14 in the system 10 is illustrated. Again, the data on the communication link 66 may be either secure encrypted data or non-secure that is delivered to the integrator 20 and processed by the batch program 68. This data is generally only provided to the integrator 20 and not accessible by the farmer on the farm 14. Again, the integrator 20, however, determines what information and data to make available to others and who may receive the selected data.

The integrator 20 may monitor the live production 78 within each farm house 12 by way of graphs 80, charts 82, and tables 84 to support flock analysis, exception reporting and grower/servicemen training 86. This live production monitoring 78 includes monitoring the environment within the farm house 12 to ensure that the environment is within a list of standards. As discussed in further detail herein, the data collection and communication from the controller 22 and/or the monitor box 24 may be substantially real time. Therefore, the integrator 20 may receive the data through the link 66 substantially as rapidly as the integrator 20 desires. Therefore, the integrator 20 may desire to receive a data uplink or data set at a selected rate, such as once a day or more or less often, as selected, such that the integrator 20 may perform real time analysis and scheduling based on the data received. Therefore, the integrator 20 may select to have data sent over the link 66 at a selected rate so that a selected action may occur at a selected rate, such as rate of delivery, animal pickup, and other appropriate actions. Therefore, the integrator 20 can perform autonomously or assist the farmer on the farm 14, or request the farmer perform certain actions according to the data collected.

For example, temperature data will be transmitted, via the secure or unsecure link 66 at a selected sample rate and compared to a required or selected temperature. Should the temperature ever fall outside the required and selected temperature window, flags can be set and identified within the graphs 80, charts 78, or tables 84. This leads to printing of exception reports 86 identifying that certain parameters are outside the required standards. Likewise, feed consumption, water consumption, humidity levels and lighting can also be monitored similar to the temperature to confirm compliance with desired standards that have various adjustable tolerances. This information is used in the flock analysis, exception reporting, as well as for providing information to the grower/serviceman 86. The information may be provided for growers/servicemen training but the information may be provided to the growers/servicemen for providing real time solutions to the flags or exception reporting. Therefore, an exception or an indication that one of the parameters is not being met may create a flag or exception report that must be attended to by a selected serviceman or grower. Therefore, the integrator may collect the data through the communication link 66 and the integrator control and data system 18 may provide the exception report such that the grower/serviceman may perform the appropriate task to solve the issue.

In this regard, the integrator 20 may provide certain information to the grower or farmer in order for the farmer to improve its quality or yields. For example, the integrator 20 may monitor numerous farms 14 each containing several farm houses 12. By identifying which farms 14 or farm houses 12 are operating efficiently and providing the highest yields, the control parameters from these farm houses 12 can be provided to the other growers or servicemen monitoring the other farms 14 to provide a more uniform harvest throughout the integrator's system 10.

The integrator 20 can also automate its entire operation based upon the data gathered by the integrator control and data system 18 within the system 10. For example, the integrator 20 can coordinate with its processing plants 88 by monitoring bird weights 90 in order to generate harvest schedules 92. For example, should the integrator 20 have a client that requires birds having a particular weight in a selected period, such as after three weeks, the integrator 20 can analyze the bird weights from the various farms 14 and even in each farm house 12 to select which farm houses 12 that may be ready for harvesting in three weeks with the proper bird weights. This provides an accurate harvest schedule 92 for the integrator 20 that can be used by the processing plant 88. This may allow the processing plant 88 to schedule a pick-up of the proper number of birds at the proper farm 14 in the proper farm house 12 on the required day in order to meet the three week delivery to the desired or selected customer. This information can also be provided to each processing plant 88 that the integrator 20 contracts with or owns, via the internet connection 72. Again, any connection type may be used and the connection may be secure or not.

The integrator 20 can also inform the feed mill 94 when feed deliveries 96 are required, based upon monitoring of feed bin inventories 98. In this regard, the integrator 20 may have contracts with several farms 14 and may thus, be responsible for feed delivery 96 from several feed mills 94 in order to ensure that the bin inventories 98 at each farm 14 are met. By monitoring the feed consumption substantially in real time or continuously of each farm house 12 on each farm 14, as well as the bin inventories 98, the integrator 20 can easily schedule feed deliveries 96, also substantially in real time, at appropriate times directly with the feed mills 94. Again, these feed deliveries 96 can be scheduled, via internet access 72, or any appropriate communication, provided to the feed mills 94 by the integrator 20. Again, as discussed above, the integrator 20 may communicate the feed mills 94 without communication with the farmer on the farm 14. The integrator 20 that receives the data over the communication link 66 provided the controller 22 and/or the monitor box 24 sends the information over the selected connection, such as the internet 72, to the selected number of the several feed mills 94 to ensure that feed is sent to the appropriate farm house 12 at a selected time.

The integrator 20 may also integrate its account payable system 100 into the integrator control and data system 18 to provide for grower payments or settlements 102, based upon generating reports 104 from data gathered from each farm house 12. These reports 104 can include when the livestock has been harvested and whether or not the livestock has met the required weight. Quality of the livestock can also be monitored. All of these factors effect the growers settlement 102.

The integrator 20 may also provide data and reports through the internet 72, via the integrator's web page 106. The web page 106 can be password protected and accessible by the growers 108, as well as flock servicemen 110 or by the integrator's management 112 when they are away from the integrator's office 20. For example, the grower 108 for a specific farm can access the web page 106 to review reports generated by the integrator 20 to help assist the grower in running and managing the farm house 12. This information can include how to refine the adjustment to the internal environment in the farm house 12 to provide higher yields and higher quality products. The flock servicemen 110 that work for the integrator 20 may also access the web page 106 to schedule their visits to the various farms 14, as well as generate and receive exception reports or other data that can assist in the flock servicemen's inspection of the particular farm 14. For example, should a particular farm 14 have a parameter falling outside a standard, such as temperature, the servicemen 110 can check the corresponding systems within that particular farm house 12 on that particular farm 14, based upon the reports and information provided by the web page 106. Management 112 of the integrator 20 can also access the web page 106 remotely if management 112 is not in the office 20.

Figure 5:
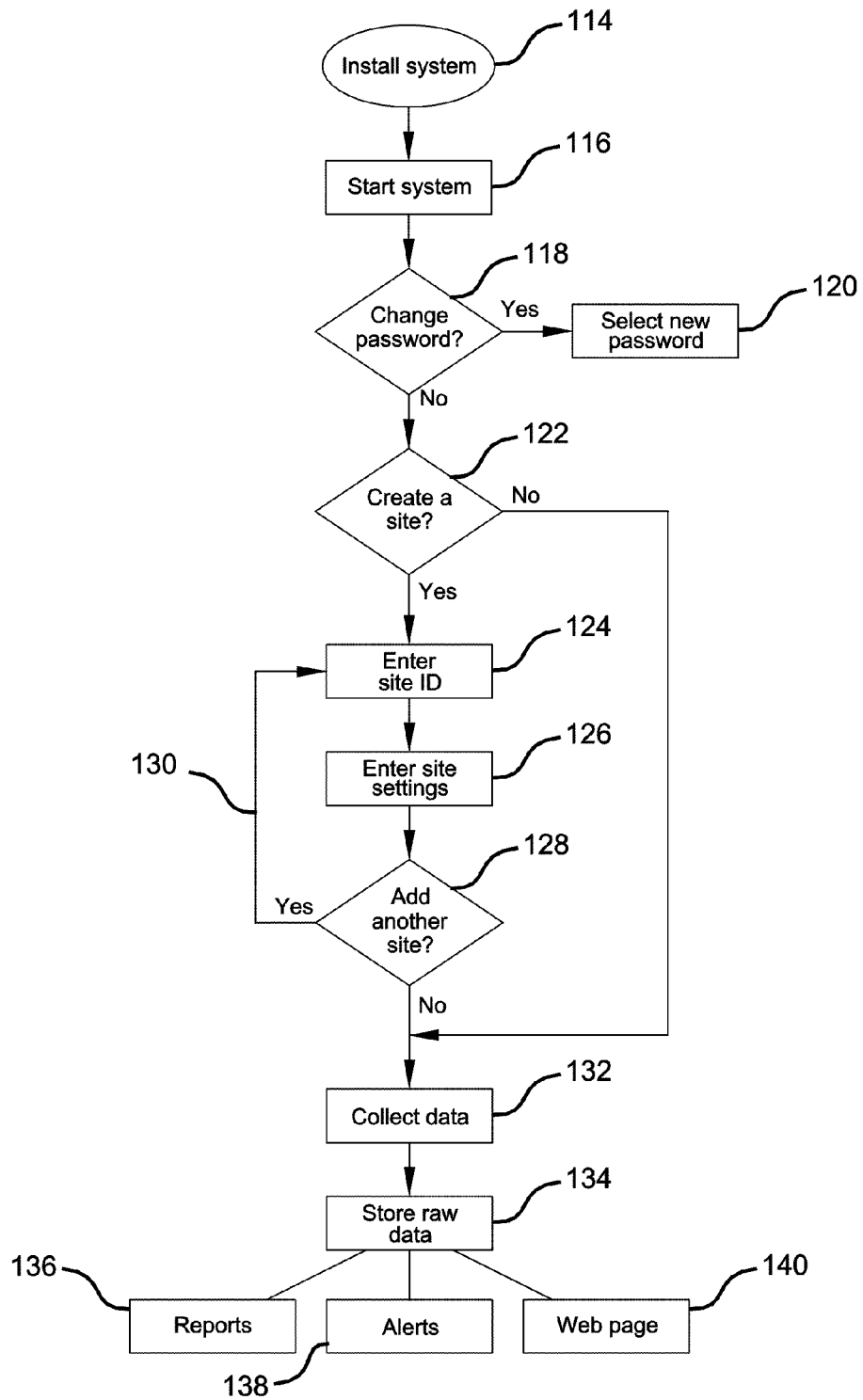
FIG. 5 is a flow-logic diagram illustrating the method for managing and operating the plurality of farm houses according to the present invention.

Turning to FIG. 5, a method for utilizing the integrator control and data system 18 within the system 10 is illustrated. The method begins at block 114, where the integrator control and data system 18 is installed. Once the system has been installed, the method proceeds to the system start-up block 116, which starts the operation of the integrator control and data system 18. Once this system has been started, the user is prompted whether or not it would like to change the password at decision block 118. Should a user decide to change the password 118, the method proceeds to block 120 where a new password is selected. If the user does not change the password, the method proceeds to decision block 122, which prompts whether or not the user wishes to create a site. This site corresponds to adding an additional farm 14 to be monitored by the integrator 20. If the answer to the decision block 122 is yes, the method proceeds to block 124, where the site ID is entered. The site ID may consist of a unique ID to identify the particular farm 14 that can include any appropriate information, such as the name and telephone number of the farm site. Once the unique ID is entered at block 124, the method proceeds to block 126.

At block 126, site settings are entered. These site settings identify what parameters are to be monitored and the time intervals in which to sample the monitored parameters. Folders are also created for storing data for each particular site. The settings can also identify at what particular dates and times the monitored parameters should be sampled. The settings can also include when this information should be downloaded by the integrator control and data system 18. Once the parameters to be monitored are identified and the sample time or rate set, the method proceeds to decision block 128. At decision block 128, the user is prompted whether or not to add an additional site. If so, the process proceeds back to block 124, via 130. Should all of the sites be entered, the method proceeds to block 132. At block 132, the method proceeds to collect the data from the various farms 14. For example, data regarding feed flow, temperature, or animal weight may be collected.

The data is collected sequentially by gathering data from each site one after the other at the specified collection dates and times and at the specified sample rates. The collected data is time stamped and marked accordingly for use later. The header section of the data may also contain identification information about the particular farm 14 or site ID. Once the data is collected, the method proceeds to block 134 where the raw data is stored. The system 18 may utilize a single common folder to receive incoming files. The file naming convention can be random, sequential, based upon farm number, house number and date and time. Once the raw data is properly stored at block 134, the method proceeds to either providing various reports 136, various alerts 138 or various web page access updates 140. As discussed herein, the reports 136 and the alerts 138 may be provided or sent using any appropriate method. Both the reports 136 and the alerts 138, however, may also be provided on the web page 140, such as an integrator web page 106, for access by selected individuals such as the grower 108, the servicemen 110, or various management or workers 112.

The reporting capabilities block 136 may include raw data, derivative data, comparison to standards, and statistical analysis that may be presented both in column and graphical views. Moreover, any other type of reports may also be generated with the understanding that the enclosed reports are merely exemplary. Each column can include various parameters of data sampled over time such as temperature and humidity, while other columns can include averages or other mathematical derivations of the other columns. Raw data column definitions define the data in each raw data column that may be received from the controller 22 and stored in the system database. Derivative columns are defined as the calculation results of mathematical operations performed on raw data columns and/or other derivative columns. Derivative columns may be limited to functions that can be expressed as row operations on a single row of data containing the derivative value. Derivative data column definitions define a "formula" or "calculation" performed to derive the derivative column from the raw data. Derived column set-ups may consist of column name, moving average, N-points or N-minutes, N (as a long integer), and formula. Users may be able to select from predefined formulas or create user defined formulas. Standards for all raw and derivative columns may be assigned within an "assigned standards" dialog box. A spreadsheet like grid will display all column names, and based upon age, data will be entered directly into the grid which will then be stored in the database. Administrators will assign user IDs, passwords and permissions for all users of the program and web interface. All user information is stored securely within the system database. Only users with administrative rights may access the application setups and configuration capabilities. Reports and charts may have the option of displaying raw data columns, derivative data columns, moving averages for any raw or derivative column, regression lines, correlation analysis, column totals and averages, column coefficient of variance, column standard deviation, and groupings and subtitles by any variable (raw or derivative).

In the alerts block 138, all defined alerts may be displayed in a spreadsheet like grid showing which farms 14 have data outside the normal range as defined by the standard minimum and maximum values for a selected time period. The time period display may be concurrent with the data collection interval specified in the site setting block 126. Based upon predefined standards, each defined raw and derivative data column may have a "yellow" and "red" minimum and maximum value that can be assigned and stored in the database. Monitoring of collected data for values outside of specified ranges may be executed and in the event that unaccepted values are encountered, a flag in any appropriate form, such as in the form of a sound or a message can occur.

In the web page block 140, the web page extension may provide access to limited reporting functions through the Internet or a company Intranet for contract producers (growers) and technical advisers (serviceman). The web page extension 140 may also provide the ability to select, view and print predefined reports. The web interface 140 may also allow serviceman or others to insert comments into the data which can be reviewed by the integrator 20.

The use of the system 10 thereby enables the integrator 20 to substantially and completely automate its entire operations with contract farms 14 or farms 14 that it owns. This enables the integrator 20 to monitor and control operations on the farm house 12 directly. Alternatively, the integrator 20 may have the farmer control the operations within the farm house 12, either alone and/or according to instructions from the integrator 20, as the integrator monitors the farm house 12. The system 10 also enables the integrator 20 to coordinate other necessary operations. These operations include coordinating with processing plants, feed mills, hatcheries, payments, servicemen, and others. The system 10, therefore, provides the capabilities to the integrator 20 to monitor and control all operations in the farm house 12, provide for more uniform and higher quality products and yield, resulting in meeting the integrator customer's desires more effectively.

As discussed above, the monitor box 24 is optionally used or operated in conjunction with the controller 22. Nevertheless, either the monitor box 24 or the controller box 22 may be provided in the farm house 12 substantially independently of the other. It may be selected to provide the monitor box 24 substantially independently of the controller box 22 if the controller 22 is not present, or if the farm house 12 does not require the controller 22. In addition, the monitor box 24 may be substantially interconnected or used in conjunction with any appropriate controller 22 and the two need not be a substantially integral system. That is, the monitor box 24 may monitor a selected portion of the farm house 12 and provide the information to a user, such as through a network as described above, through a manual reading or through a short range transmission. Regardless, the monitor box 24 may interconnect with a plurality of sensors to store, transmit, monitor or perform other appropriate actions in the farm house 12.

Figure 6:
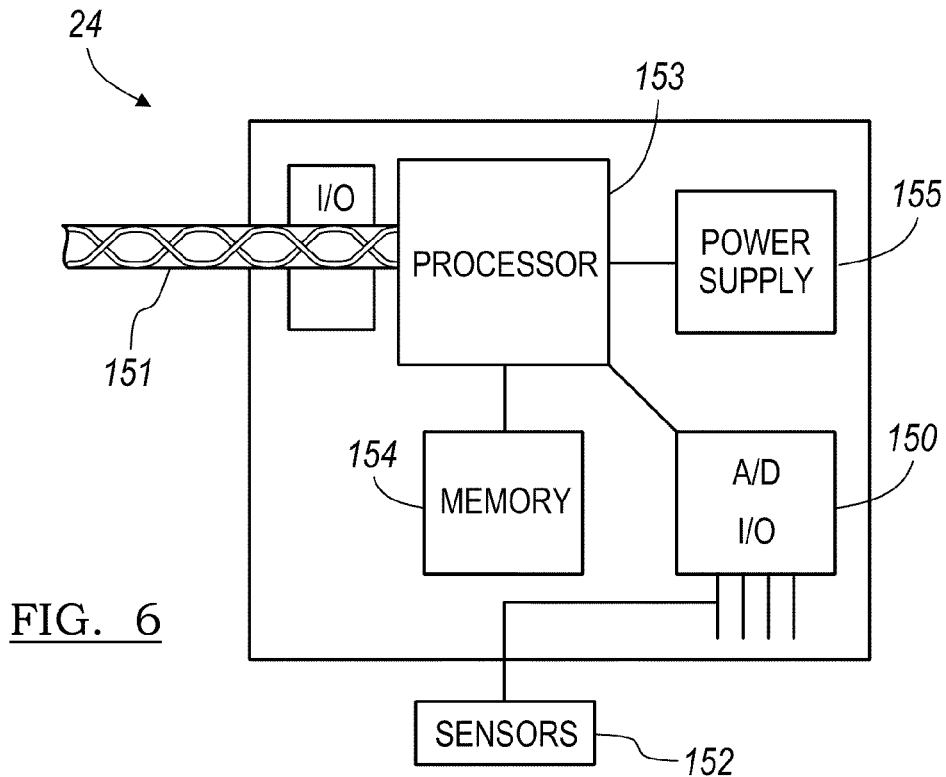
FIG. 6 is a diagrammatic view of a monitor box according to various embodiments.

With reference to FIG. 6, the monitor box 24 may include a plurality of portions illustrated diagrammatically in the monitor box 24 and may be positioned in any location, such as the farm house 12. It will be understood that the diagram of FIG. 6 is merely exemplary. Moreover, the portions included in the diagram of the monitor box 24 are neither inclusive nor exclusionary. The monitor box 24 may include any appropriate portions to receive a signal from a sensor and perform a function on the signal, such as transmitting, storing, or analyzing the signal.

The monitor box 24 may include an analog to digital converter (A/D) 150. The A/D converter 150 may also provide an input/output (I/O) for the monitor box 24. Therefore, the A/D converter may be interconnected with a bus or communications line 151 that may be connected to the controller 22 or to the integrator 20 or to the farmer control data system 16. Therefore, various instructions or data may be provided to the A/D converter 150 and to the monitor box 24 or information or a data set may be sent over the bus line 151 to the users. It will be understood that various transmission portions such as an optional radial frequency transmitter (RF), various other wireless communication technologies such as infrared (IR) may be used.

Further interconnected with the A/D converter 150 may be a plurality of sensors 152 as discussed above and herein. The sensors 152 may be interconnected with the A/D converter 150 to receive an analog signal which relates to a state of the sensor 152. The A/D converter 150 may then convert the analog signal into a digital signal that may be transmitted to a processor 153. Therefore, the state of the sensor 152 may produce a signal that can be transmitted to the A/D converter 150 which may then produce a digital signal to send to the processor 153. It will be understood, by one skilled in the art, that the processor 153 may also be produced or designed to include, internally, one or more of the A/D converters 150 rather than having a separate discrete component.

The processor 153 may be programmed with a selected set of instructions for determining a process that may based on the information sent from the sensors 152. The information may be sent over the bus line 151 or may be stored in a memory module 154. The memory module 154 may be any appropriate memory module such as a substantially solid state memory such as a flash memory, a random access memory, or the like. Alternatively, the memory module 154 may be a hard disk memory portion or any appropriate memory portion. Therefore, the information from the sensors 152 may be processed by the processor 153 and saved in memory 154. The processor 153 may perform a selected set of instructions on the information from the sensors 152, as discussed herein.

It will be understood that the processor 153 may be directly connected to the bus line 151. Therefore, the signal form the processor 153 may be sent as a digital signal directly to the bus line 151. Moreover, the communication may be first transmitted through an I/O portion interconnected with the bus line 151 to increase the signal to noise ratio or for any other purpose. Therefore, the bus line 151 may be connection through the A/D-I/O converter 150 or directly to the processor 153. Moreover, as mentioned above, each of the portions, including the A/D converter 150, the memory 154, and any appropriate I/O ports may be included in the processor 153. Therefore, rather than having discrete portions, the processor may be designed to perform each of the functions appropriate to the monitor box 24.

Further, a power supply 155 may be provide power to the processor 153 and to the memory 154. Furthermore, the power supply 155 may provide power for any selected function or portion of the monitor box 24. Therefore, the power supply 155 may be substantially internal or external to the monitor box 24.

Figure 7A:
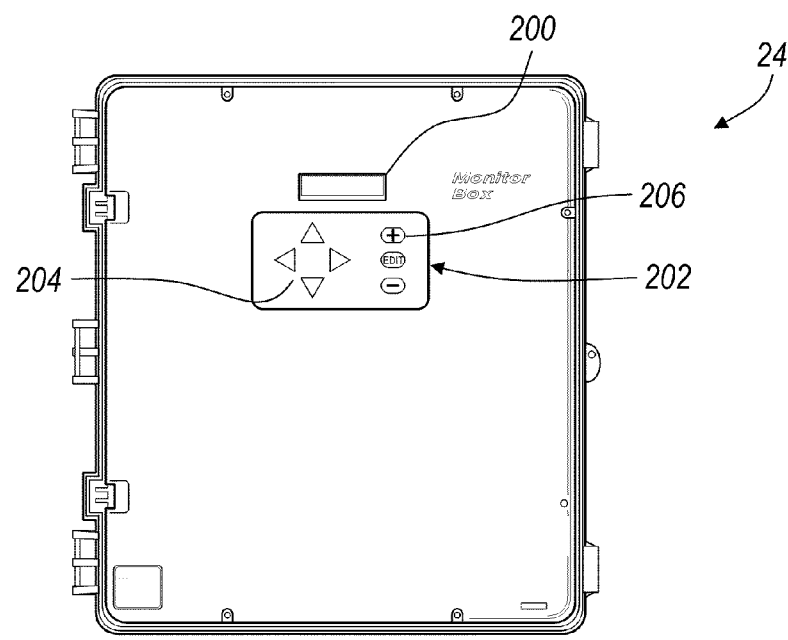
FIG. 7A is an elevation view of a monitor system according to various embodiments.
Figure 7B:
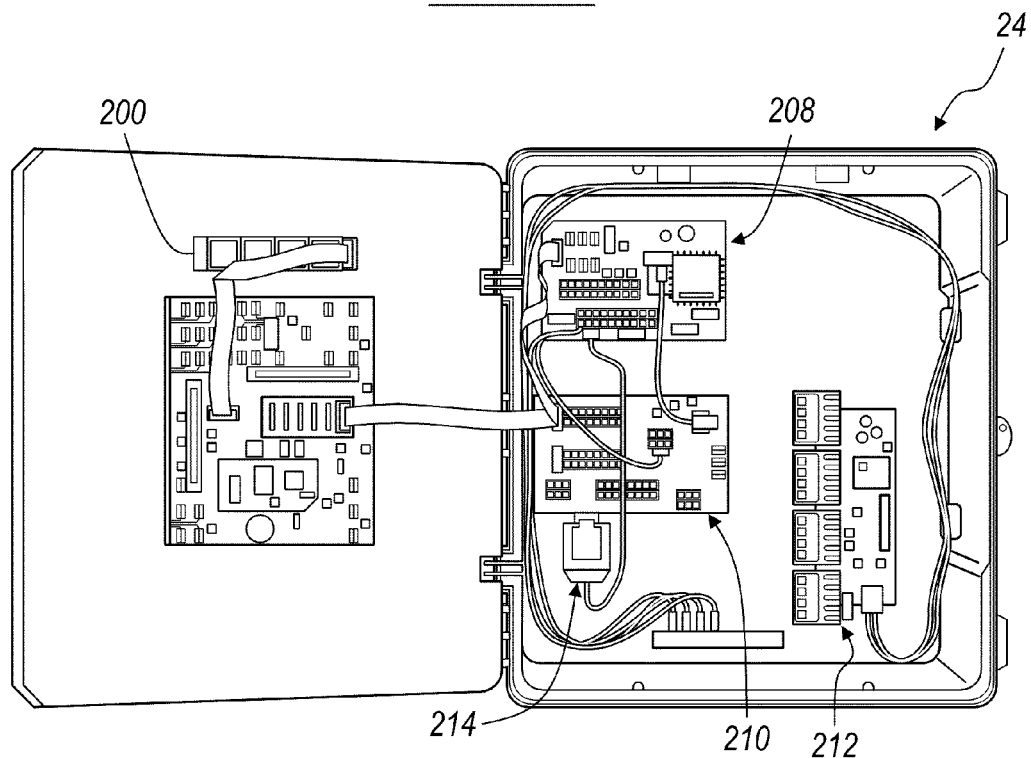
FIG. 7B is a diagrammatic view of the monitor system according to various embodiments.

With reference to FIGS. 7A and 7B, the monitor box 24 may be provided in any appropriate manner. The monitor box 24 may be any appropriate formation and may include an assembly or system of portions. Therefore, the monitor box 24 need not simply be a box, but may a plurality of portions that perform the monitoring and associated functions.

According to various embodiments, the monitor box 24 may be substantially controllable through a minimal number of operations for various reasons. For example, the monitor box 24 may be substantially provided to transmit the monitored information or data and not be read at the monitor box 24. Nevertheless, the monitor box 24 may provide a viewing screen 200 for viewing of information relative to the monitor box 24. In addition, the viewing screen 200 may be used to program or calibrate the monitor box 24. In addition, the monitor box 24 may include a control panel 202 that includes a plurality of switches such as multi-directional switch portion 204 and entry switches 206. The monitor box 24 may be provided with a substantially touch sensitive screen such that the viewing screen 200 need not be provided substantially separately from the control panel 202. Either the touch screen may allow for entry of data into the monitor box 24 and retrieval of data from the monitor box 24.

With reference to FIG. 7B, the monitor box 24 may enclose a plurality of selected boards. For example, the monitor box 24 may include a first input/output (I/O) board 208, a second I/O board 210 and an Input Digital Module (IDM) board 212. It will be understood by one skilled in the art that any appropriate processors or printed circuit boards may be provided to carry out the functions of the monitor box 24. The various boards 208, 210, 212 may allow for an input of a signal or data into the monitor box 24 that may be monitored by the monitor box 24 and sent to a selected user. It will be understood, however, that the monitor box 24 may include any number of selected boards for receiving data from various sensors and members in the farm house 12 and the included boards are merely exemplary. In addition, the monitor box may include internal or enclosed monitor portions such as a static pressure sensor 214. It will be understood that the static pressure sensor 214 is not necessarily included in the monitor box 214, but may be provided for monitoring a selected pressure within the farm house 12 or within the monitor box 24.

The input/output boards 208, 210 may be substantially similar to the A/D converter 150 as illustrated in the diagram above. The A/D converter 150 may communicate with a selected system or individual, such as the integrator 20 or the farmer system 16. In addition, the data may be encrypted both before leaving the monitor box 24 or as it is being received from the various sensors. Moreover, both an analog or digital signal may be received or produced by the monitor box 24.

In addition, the monitor box 24 may include the processor 153. The processor may receive the data and transform the data prior to storing and/or transmitting the data. In addition, the monitor box 24 may receive a signal, such as an analog signal, that must first be processed and converted to a digital signal prior to sending or storing the signal as data. Therefore, it will be understood that the monitor box may both receive analog and digital signals that may be processed within the monitor box 24.

Figure 8:
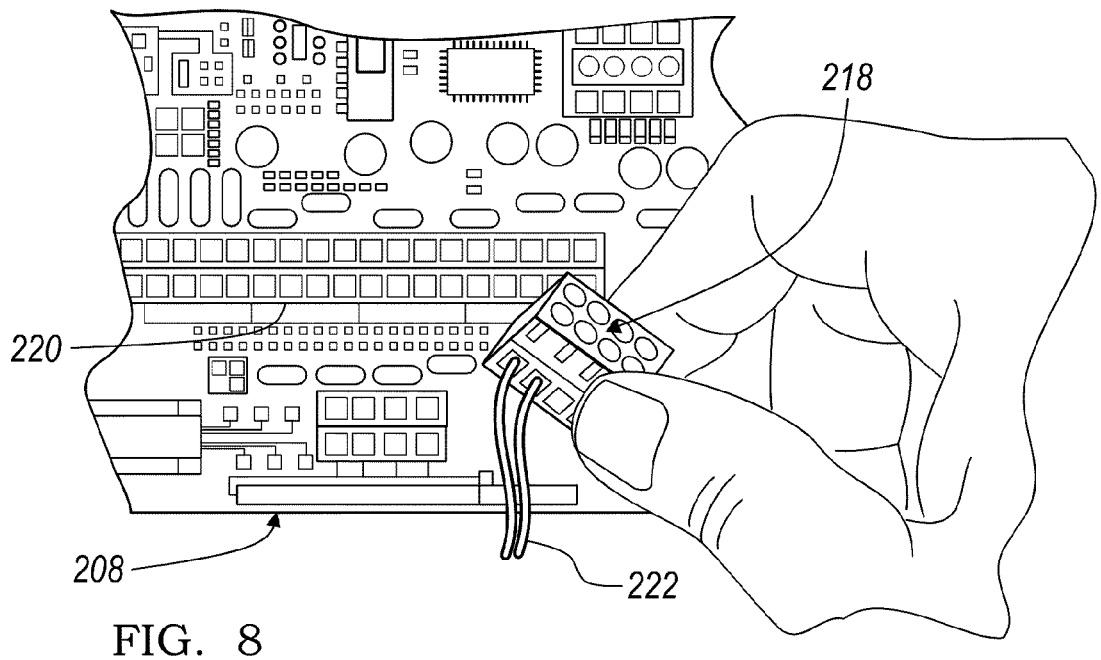
FIG. 8 is a diagrammatic view of a connection within the monitor system, according to various embodiments.

It will be understood that various sensors may be interconnected with the monitor box 24 using any appropriate mechanism. Although any appropriate mechanism may be used with reference to FIG. 8, an exemplary mechanism may include a terminal connector 218. The connector 218 may interconnect with a receptacle 220 on the first I/O board 208. Nevertheless, it will be understood that various portions of the sensors, including a signal line 222 need not be interconnected with the I/O board 208 with the connector 218, but may be connected in any appropriate manner. Simply, the connector 218 may allow for an ease of interconnection and simplifying connecting the monitor box 24 with various sensors in the farm house 12.

Therefore, it will be understood that any appropriate number of sensors may be interconnected with the monitor box 24. For example, wind speed sensors, feed scale sensors, water scale sensors, and other appropriate sensors may be provided in the farm house 12 and interconnected with the monitor box 24. As discussed herein, and above, the monitor box 24 may receive data or signals from the various sensors and provide the data to selected users such as over a network, which may be substantially wired, wireless or other appropriate mechanisms, such that the monitor box 24 may provide data to a user. Regardless, the monitor box 24 may be interconnected with a plurality of each type of sensor and need not simply interconnect with a single selected sensor. Therefore, any appropriate number of connections may be provided on the various boards and any appropriate number of boards may be provided in the monitor box 24.

Figure 9:
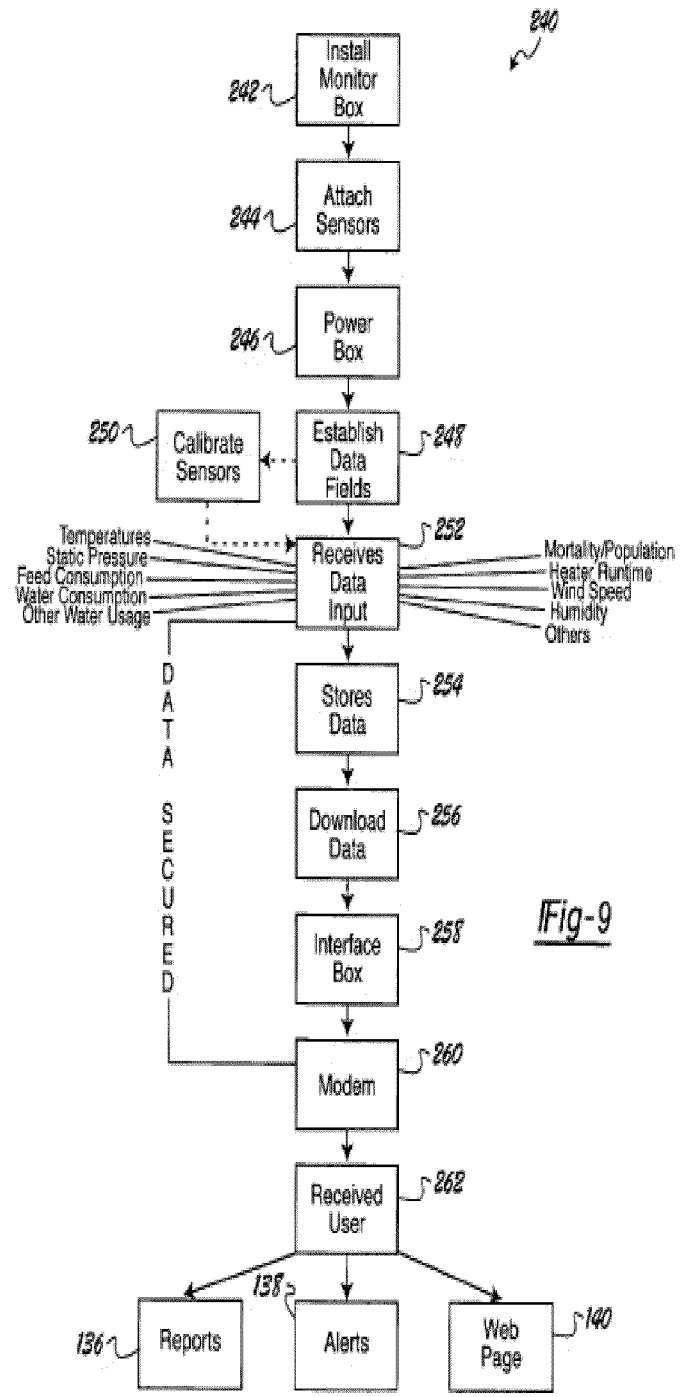
FIG. 9 is a flow chart of a method of use of the monitor system according to various embodiments.

With reference to FIG. 9, the monitor box 24 may be used according to various processes, such as those described in method 240. The method or system 240 allows for use of the monitor box 24 substantially independently of the controller 22. Nevertheless the monitor box 24 may be used to monitor a selected number of sensors such as those included in the farm house 12 and provide the data to a selected user for various reasons. For example the monitor box 24 may be used with the controller 22 to monitor conditions within the farm house 12 to allow the controller 22 to control various portions of the farm house 12 to achieve or maintain various conditions. Alternatively, the monitor box 24 may be used without the controller 22, or in addition thereto, to monitor conditions within the farm house 12 for a user. The user receiving the data form the monitor box 24 may or may not be the owner or maintainer of the farm house 12.

The system 240 generally starts with installing the monitor box in box 242. After installing the monitor box in block 242, the sensors may be attached in block 244. The sensors may include any appropriate sensor, such as those described above or any appropriate sensor, such as including a temperature sensor, a static pressure sensor, a feed consumption sensor, a water usage sensor, a heater run time sensor, a wind speed sensor, a humidity sensor, or other appropriate sensors. Nevertheless, the sensors may be attached to the portions of the I/O box, such as the boards 208, 210, 212. In addition, the sensors may be attached to any appropriate portion of the monitor box 24 such that the monitor box 24 is operable to monitor or receive data. In addition, any appropriate number of any individual sensors may be provided. For example, a plurality of temperature sensors may be provided to sense the temperatures in various portions of the farm house 12.

After the sensors are attached in block 244, the monitor box 24 may be powered in block 246. Powering the monitor box 24 may be provided by the power source 155, such as in box 246, and may allow for activating the monitor box 24 and all for initialing programming and calibration of the monitor box 24. Therefore, the monitor box 24 may be established with particular data fields in block 248. The data fields established in block 248 may be any appropriate data fields. For example, the data fields may include substantially user defined data fields or pre-defined data fields. Therefore, the data fields may generally relate to the type of sensors attached in block 244. The user may establish a plurality of fields, including fields for a temperature, static pressure or any other appropriate sensor that was attached to the monitor box 24 in block 244.

In addition, the user may establish a number of sub-fields for each of the type of sensors. For example, a plurality of temperature sensors may be provided in a plurality of positions within the farm house 12 and the user may define each of the positions of the plurality of the temperature sensors or the number of the temperature sensors. In addition, it will be understood that the fields established in block 248 may be those that are substantially factory or preinstalled. Therefore, the monitor box 24, including the various boards 208, 210, 212, may include a plurality of predefined fields for which the plurality of sensors provide signals or data.

After establishing the fields in block 248, or any appropriate time, the sensors may be calibrated in block 250. It will be understood that calibrating the sensors in block 250 is merely optional and need not occur. For example, the sensors may be substantially self calibrating, thus not requiring calibrating of the sensors at the monitor box 24. Regardless, each of the plurality of sensors may be substantially calibrated prior to receiving a data in block 252. For example, a known temperature may be measured relative to one or more of the temperature sensors and the measured temperature used to calibrate the temperature sensor at the monitor box 24. Therefore, calibration of the sensors in block 250 may provide substantially known data within a selected confidence interval for use by a user.

After the fields are established in block 248 and the sensors are attached in block 244, data may be received by the monitor box 24 in block 252. The data received into the monitor box 24 may include any appropriate data that may be received into the monitor box 24. The data received to the monitor box 24 in block 252 may include data that is received from the sensors, such as the temperature sensor, the wind speed sensor or any other appropriate sensor. In addition, data received into the monitor box 24 may be data that is substantially user input at monitor box 24. For example, a user may input a mortality number, or other selected data for a selected period of time, the population for a selected period of time, or other appropriate non-sensed data. The user may use the input panel 202 to input the selected data into the monitor box 24 to be stored or transmitted with the monitor box 24. Therefore, it will be understood that the monitor box 24 may monitor data substantially autonomously and may also include data that is input by a user into the monitor box 24.

Generally, once the data is received into the monitor box 24, the data may be kept substantially secured or not secured. For example, the data may be substantially encrypted once it is received into the monitor box 24 to ensure that the data within the monitor box 24 is substantially not susceptible to tampering. Nevertheless, the data need not be substantially secured within the monitor box 24 and may be easily edited or changed by a user at the monitor box 24. Regardless, the data within the monitor box 24 or provided to the monitor box 24, may be provided from the plurality of sensors, a user or other appropriate input.

The data input into the monitor box 24 is substantially stored in block 254 for at least a period of time. The monitor box 24 may include a storage system, such as flash memory system, a random access memory, a hardware memory system (such as a hard drive) or any appropriate storage mechanism. The monitor box 24 need not include a storage mechanism such that the monitor box 24 itself does not store the data as in block 254. Therefore, storing the data in block 254 is merely optional and need not occur.

The data is downloaded in block 256 to a selected user interface in block 258. Therefore, the data that is input into the block 252 may be downloaded immediately in block 256 or be stored for a selected period of time in block 254. Regardless, storing the data in block 254 will be understood to be substantially optional and not required. Rather, the data is generally received into the monitor blocks 24 in block 252 and may be downloaded in block 256 to a selected user interface in block 258.

Generally, the monitor box 24 is operable to include a processor that is able to transfer or encode the data inputted into the monitor box 24 at block 252 into a particular user interface language for downloading at block 256. For example, the monitor box 24 may include or be attached to a modem in block 260 for substantially encoding the data received into the input in block 252. The encoding of the data may occur within the monitor box 24 before the data is downloaded in block 256 or in the user interface box transmission in block 258. Regardless, the data input received into the monitor box 24 may be substantially provided in the user readable form.

The data may then be transmitted or modulated for transmission, such as with a modem in block 216. The modem in block 260 may provide the data to a user in block 262. The user in block 262 may be any appropriate portion, such as a user's server, a user's computer, a user's network, such as those described above, or any appropriate mechanism. In addition, the user may include a substantially handheld mechanism that allows for substantially short distance transmissions from the monitor box 24 to a handheld portion. The handheld portion may be substantially wireless or be interconnected with a wire connection to the monitor box 24.

It will be understood, however, that the data received in block 252 may be provided to a user in block 262 in any appropriate manner. In addition, the data may be substantially secured, as discussed above, once received in block 252 to when it is received by the user in block 262. In addition, the transmission of data may be wireless, satellite, wired or any appropriate transmission such as discussed above. Also, the user may access the data in any appropriate manner.

For example, and as discussed above, the data may be provided in any appropriate manner, such as providing the reports 136, the alerts 138 or to the web page 140. It will be understood that the monitor box 24 may provide the reports 136, the alerts 138, or information to the web page 140 substantially independently of the controller 22. Therefore, the monitor box 24 may be provided within the farm house 12 without the controller 22 for monitoring various portions of the farm house 12, such as through the sensors or with a user input for use by a user.

The monitor box 24 may be provided in the farm house 12 substantially independently of the controller 22 or within the appropriate controller 22. The monitor box 24, even if provided with the controller 22, may operate substantially independently of the controller 22 for receiving data or signals for a selected user of the monitor box 24 such that the farm house 12 may be monitored by the user in block 262 even if the user does not have access to the controller 22 or if there is no controller in the farm house 12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of monitoring data at a farm house, comprising:

sensing a farm house condition with a sensor positioned at the farm house;

transmitting a sensor signal based on the sensed condition at the farm house to an integrator data and control system operated by a second user different from a first user;

retrieving the transmitted sensor signal with the integrator data and control system;
accessing with the integrator data and control system a selected condition for the farm house in condition of a selected quality and yield of a selected product from the farm house; and
producing a signal with the integrator data and control system based upon a comparison of the retrieved transmitted sensor signal with the integrator data and control system and the accessed selected condition for the farm house;
wherein the integrator data and control system is located remote from the farm house.

2. The method of claim 1, further comprising:
communicating with a communication link between the integrator data and control system and a monitor box or a first controller, wherein at least one of the monitor box or the first controller are associated with the sensor that senses the farm house condition.

3. The method of claim 2, further comprising:
controlling the farm house through the controller directly with the integrator data and control system through the communication link.

4. The method of claim 3, further comprising:
processing an alert with the integrator data and control system;
wherein the alert notifies that the sensed farm house condition is outside a set maximum value or minimum value.

5. The method of claim 4, further comprising:
sending the processed alert with a wireless network.

6. The method of claim 4, further comprising:
providing the processed alert to a web page.

7. The method of claim 2, further comprising:
sending instructions from the integrator data and control system based on the monitoring.

8. The method of claim 7, wherein sending instructions includes at least one of sending instructions to a farmer, a service man, or a customer.

9. A method of monitoring data at a farm house, comprising:
sensing a farm house condition with a sensor positioned at the farm house operated by a first party;
transmitting a sensor signal based on the sensed condition at the farm house to an integrator data and control system that is located remote from the farm house, wherein the integrator data and control system is operated by a second party different from the first party;
accessing with the integrator data and control system a selected condition for the farm house in consideration of a selected quality and yield of a selected product from the farm house; and
producing a signal with the integrator data and control system based upon a comparison of the transmitted sensor signal and the accessed selected condition for the farm house.

10. The method of claim 9, further comprising:
accessing a web page with a second system separate from the integrator data and control system to obtain information regarding the farm house or retrieve instructions relating to the farm house.

11. The method of claim 10, wherein accessing the web page includes providing a report generated to assist a grower in running and managing the farm house.

12. The method of claim 10, wherein accessing the web page includes providing a report generated to schedule a visit by a flock servicemen.

13. The method of claim 10, wherein accessing the web page includes receiving an exception report or other data regarding the farm house, including receiving an alert regarding the farm house condition being outside of a set limit.

14. The method of claim 12, wherein receiving an alert includes:
viewing a display in a grid showing one or more farm houses that have sensed farm house conditions outside a normal range as defined by a standard minimum value and maximum value for a selected time period.

15. The method of claim 14, further comprising:
specifying the normal range via the integrator data and control system.

16. The method of claim 10, wherein accessing the web page includes accessing reports of raw data, derivative data, comparison to standards, and statistical analysis that are presented both in at least one of a column view or a graphical view.

17. The method of claim 10, further comprising:
providing a password to access the provided reports through the web page.

18. A method of monitoring data at a farm house, comprising:
selecting a farm house operated by a first party;
selecting a parameter, by a second party different from the first party, of the farm house to monitor;
determining, by the second party, an optimal value of the selected parameter; specifying a normal range, by the second party, of the selected parameter from the optimal value;
receiving a monitored signal with an integrator data and control system including a monitored value of the selected parameter;
comparing the monitored signal to at least the specified normal range of the selected parameter; and
producing a signal with the integrator data and control system based upon the compared monitored signal to at least the specified normal range of the selected parameter.

19. The method of claim 18, further comprising:
preparing a report from the second party regarding a result of the comparison of the monitored signal to at least the specified normal range of the selected parameter; and
providing the prepared report to at least one of the first party or a third party, wherein the third party is different than the first party or second party.

20. The method of claim 18, further comprising:
providing a control signal to control the selected farm house based at least on the comparison of the monitored signal to at least the specified normal range of the selected parameter.

21. The method of claim 18, wherein selecting a parameter includes selecting at least one of a feed amount, a water amount, a humidity, a temperature, a ventilation, a humidity, an animal waste, a feed flow, and combinations thereof.

22. The method of claim 19, wherein said third party includes at least one of a party selected from a group including a feed mill, a serviceman, a livestock transfer, and combinations thereof.

23. The method of claim 18, further comprising:
preparing a report from the second party regarding a result of the comparison of the monitored signal to at least the specified normal range of the selected parameter; and
providing the prepared report to be accessed via a web page to obtain information regarding the farm house or retrieve instructions relating to the farm house.

24. The method of claim 18, further comprising:
preparing a report from the second party regarding a result of the comparison of the monitored signal to at least the specified normal range of the selected parameter; and
providing the prepared report to assist a grower in running and managing the farm house.

25. The method of claim 18, further comprising:
preparing a report from the second party regarding a result of the comparison of the monitored signal to at least the specified normal range of the selected parameter; and
providing the prepared report to schedule a visit by a flock servicemen at the farm house.

26. The method of claim 18, further comprising:
preparing a report from the second party regarding a result of the comparison of the monitored signal to at least the specified normal range of the selected parameter; and
providing the prepared report to provide exception reports or other data regarding the farm house, including providing an alert regarding the condition at the farm house being outside of a set limit.

27. The system of claim 26, wherein the controller includes the monitor system.

* * * * *